United States Patent [19]

Ridgway

[11] 4,216,657
[45] Aug. 12, 1980

[54] MIST FLOW OCEAN THERMAL ENERGY PROCESS

[75] Inventor: Stuart L. Ridgway, Santa Monica, Calif.

[73] Assignee: R & D Associates, Marina del Rey, Calif.

[21] Appl. No.: 888,018

[22] Filed: Mar. 20, 1978

[51] Int. Cl.² ............................................. F03G 7/04
[52] U.S. Cl. ....................................... 60/641; 60/688; 60/689
[58] Field of Search ............... 60/641, 398, 688, 689; 415/2; 417/52, 65

[56] References Cited

U.S. PATENT DOCUMENTS

| | | | |
|---|---|---|---|
| 2,006,985 | 7/1935 | Claude et al. | 60/641 |
| 3,796,051 | 3/1974 | Kuwabara | 60/398 |
| 3,967,449 | 7/1976 | Beck | 60/641 |
| 4,092,828 | 6/1978 | Garza | 60/398 X |

Primary Examiner—Allen M. Ostrager
Attorney, Agent, or Firm—Poms, Smith, Lande & Rose

[57] ABSTRACT

Power is generated using the temperature difference between the water at the surface of a large body of water whose temperature might be in the vicinity of 25° C. or 77° F., and water at considerable depth in the body of water whose temperature might be in the order of about 5° C. or 41° F. A floating structure is provided which extends in the order of 50 meters below the surface of the water, and input water is initially filtered and deaerated, and then drops for most of the height of the submerged structure before driving a conventional hydraulic turbine. The warm water at the output of the turbine is returned to the level of the surface of the body of water by a mist flow pump arrangement using a large tapered duct that is operated at reduced pressure, with droplets of the warm water from the output of the turbine being sprayed into the bottom of the duct. With the duct being at a pressure below the saturation vapor pressure of the injected warm water, some of the water evaporates or boils to form steam and this expanding steam carries the water droplets to the top of the duct against the force of gravity. The droplets are small enough so that the viscous friction is sufficient to enable the steam to carry them up. At the top of the duct the flow is turned radially outward to a condenser, in which cold water from the depths is employed to condense the mist, and the mixed hot and cold water stream is subsequently returned to an intermediate temperature level of the body of water.

18 Claims, 3 Drawing Figures

MIST FLOW OCEAN THERMAL ENERGY PROCESS

FIELD OF THE INVENTION

This invention relates to techniques for the recovery of useful energy from the steep thermal gradient present in certain large bodies of water, including the tropical ocean.

BACKGROUND OF THE INVENTION

In the late 19th Century the French physicist D'Arsonval suggested a closed cycle process, in which a working fluid such as ammonia is evaporated in a boiler heated by the warm surface sea water, used to drive an engine or turbine, and condensed in a heat exchanger cooled by the cold deep sea water supply. This process and its many related ones require that all the heat pass twice through heat exchangers: once to enter the working fluid and again to leave it. To keep the cost of the heat exchangers at a reasonable level, as much as half of the available temperature difference was consumed across the exchanger surfaces, leaving only half for power production in the working fluid. The limiting efficiency of the conversion to useful output is the Carnot efficiency, given by the ratio of the temperature range of the working fluid to the absolute temperature of its warmest point, or $e=(T-T_o)/T$. Assuming a temperature of 25° C. (77° F.) or 298° K. at the surface of the ocean, and 5° C. (41° F.) or 278° K. at the ocean depths, the theoretical efficiency would be approximately 6.7%. A real heat engine works considerably below the Carnot efficiency, and some of the output energy or work must be consumed in pumping sea water, etc., so that an overall efficiency in the range of about 3% would be the expected result.

Another Frenchman, Georges Claude, avoided the large heat exchangers and their thermal losses by using the vapor of the sea water itself as the working fluid (See U.S. Pat. No. 2,006,985). The warm surface water was sprayed into an evacuated chamber, steam evaporated from the drops passed through a turbine to do work, and was condensed by direct contact with a spray of the cold sea water. The very low density of the steam required a large, lightly built turbine which was both expensive and fragile. Claude built an operating plant of this type on the coast of Cuba which produced 22 kilowatts of electrical power for a short time. Difficulties and cost of the turbine have generally discouraged interest in this type of plant.

Inventors have searched for a way to preserve the advantages and avoid the difficulties of the open cycle system. E. J. Beck (See U.S. Pat. No. 3,967,449) proposed that the vapor from warm water be used to lift the water itself against gravity. Bubbles of steam would be nucleated "in the water", and would produce a two-phase mixture of lower density than water, and could thus be lifted as in the well-known air-lift or gas-lift pumps used in the chemical and oil industries. Zener and Fetkovich proposed that the two-phase mixture of Beck be stabilized with a foam structure. In either case, the bubbles and the water containing the bubbles would "spill over" (in the terms of the Beck patent) into an elevated storage section. The water, once lifted, could be harnessed by means of a hydraulic turbine, instead of a steam turbine. The characteristic of these processes is that the two-phase mixture has water as the continuous phase and vapor as the dispersed phase, at least when the lifting action begins, and that the primary lifting effect is produced by balancing hydraulically a long column of lower density against a shorter one of higher density. Successive articles by Earl J. Beck "Ocean Thermal Gradient Hydraulic Power Plant", and by Clarence Zener and John Fetkovich "Foam Solar Sea Power Plant" appear at pages 293 through 295 of Vol. 189 of *Science*, in the July 25, 1975 issue.

There are major difficulties with these lift-pump processes. For the lift to succeed, the vapor pressure of the warm water at the bottom of the lift column must exceed the pressure at the top by at least the hydrostatic weight of the contents of the column, or the formation of vapor will be suppressed by submergence. Since the available vapor pressure range is low, the dispersed phase must greatly exceed in volume the continuous phase, or else the lift column must be relatively short, or both. It is very difficult to make such a light froth or foam remain stable over a large span or diameter. Beck's patent does not specify how the mixture is to be stabilized, but it is clear to anyone skilled in lift-pump practice that as the steam bubbles expand near the top of their travel (the pressure decreasing as they ascend), the continuous water phase may become discontinuous, so that slugs of water may fall back, while large slugs of vapor escape upward without lifting water. Usually contact with a nearby surface is required for stability. This would mean that such a lift pump would have to be filled with many parallel flow guides, such as a honeycomb structure, to insure stability of the mixture. This would tend to be as costly as a heat exchanger. The use of such a honeycomb flow path or of a foam-producing detergent as suggested by Zener and Fetkovich or both seem the only way to attack these problems, and these solutions create other problems in turn.

A different type of difficulty with these systems is that lifting the water upward from the sea surface, whence it falls again through a hydraulic turbine, necessitates a voluminous vacuum structure which must float high out of the sea, with accompanying problems of stability and windage. In addition, it is quite inconvenient to extract power from the two-phase vapor and water mixture which is obtained following the bubble lift pump step of Beck.

One object of the present invention is to obtain the advantages of the open cycle process for ocean thermal power while avoiding the problems of large steam turbines operating at supersonic vapor speeds on the one hand and the problems of unstable two-phase flow on the other. A further objective of the invention is to provide a technique whose natural configuration lends itself to a compact, economical, sea-worthy, and low-profile arrangement well suited to practical sea-going use.

BRIEF SUMMARY OF THE INVENTION

A specific preferred embodiment of the invention utilizes a closed, evacuated, cone-shaped or pyramidal hull, floated base upward in the sea. Inlets in the side allow warm surface water to enter, where it is filtered and then allowed to fall through penstocks to the lower (small diameter) portion of the hull. There it passes through hydraulic turbines which extract useful power. The warm water then is sprayed upward into the bottom of an evacuated chamber, the spray nozzles being designed to produce small, uniform, evenly-spaced droplets. Evaporation or boiling from the surface of the droplets produces a large volume of water vapor which rises rapidly to the top of the chamber, sweeping the droplets with it. The top of the vessel connects to spray condensers fed by cold sea water taken from below the thermocline. The mist of warm vapor and droplets pass together into the condenser, mix with the cold water, and the condensed mixture at an intermediate temperature is returned to the sea at an intermediate depth.

In accordance with a broad aspect of the invention, an apparatus for generating electricity from the thermal gradient in a large body of water includes a structure extending from near the surface of the water, for a substantial distance below the surface of the water, a hydraulic turbine located within the structure well below the surface of the water, a conduit for bringing warm water into said structure near the surface of the water and directing it to drive the turbine, and arrangements for raising the warm water from the turbine to the surface level of the water.

An important aspect of the invention involves the mist flow pump for raising water through the use of a duct maintained at reduced pressure, and arrangements for spraying very fine droplets of warm water into the lower end of the duct, whereby the generated vapor will carry the droplets up through the duct. The vapor and droplets may be collected by cold water sprays above and around the upper end of the duct.

The present system conveniently provides for deaeration at low pressure points in the system, for example, following the hydraulic turbine.

Features of this invention include (1) the direct, controlled production of a low density two-phase mixture, (2) the use of a two-phase mixture having vapor as the continuous phase and water or brine as the dispersed phase, (3) the lifting of this mixture without the need for or the limitations of a balanced pair of hydrostatic columns, (4) the placement of the hydraulic turbine and its penstock ahead of the lifting device, and (5) deaeration after the turbine. As will be explained in the detailed description, these advantages go beyond the normal purpose and function of such elements, and serve to make the overall system more practical, workable, and economical than previously proposed systems for generating electrical power from the thermal gradient of large bodies of water.

Other objects, features, and advantages of the invention will become apparent from a consideration of the following detailed description and from the accompanying drawings.

DETAILED DESCRIPTION

Figure 1:
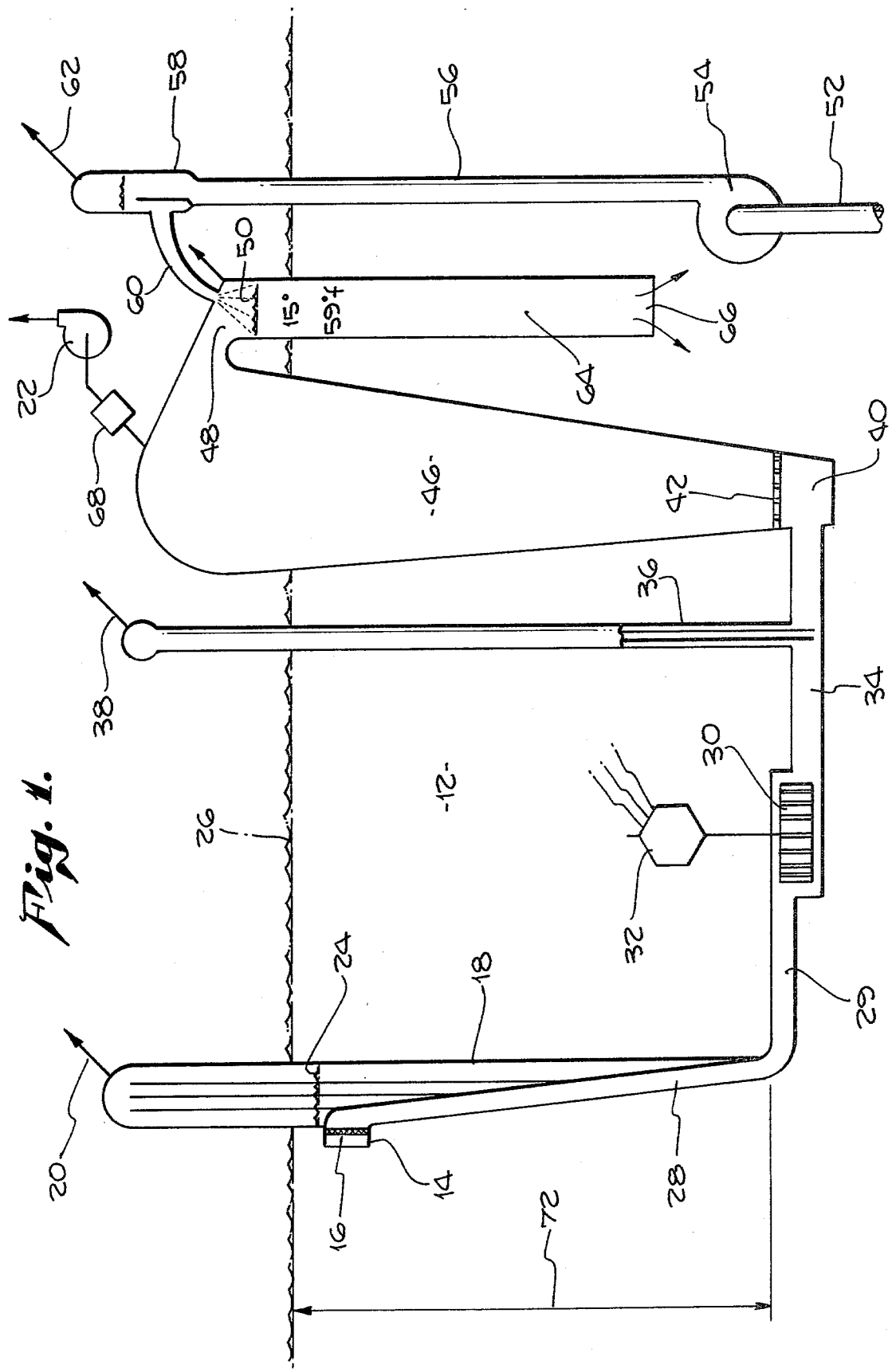
FIG. 1 is a schematic representation of one illustrative system implementing the present invention.

With reference to FIG. 1, this showing is purely schematic in its illustration of the power generation system of the present invention. It is "unfolded" from the structural arrangement of FIG. 2 to facilitate explanation of the process and system.

In FIG. 1, the tropical ocean is indicated by the reference numeral 12. The temperature near the surface of the body of water 12 will be assumed to be in the order of 77° F., or about 25° C. As previously noted, 25° C. corresponds to approximately 298° K., where 273° is approximately freezing on the Kelvin or absolute scale of temperature, corresponding to 0° C. and 32° F. At substantial depths in many large bodies of water, the temperature of the ocean approaches freezing and is in the order of 5° C., or about 41° F., or about 278° K. In order to reach temperatures which are this low, it is necessary to draw water from several hundred meters or more below the surface of the ocean, sometimes as much as 500 or 1000 meters deep. The foregoing discussion of temperatures was considered appropriate in view of the fact that the system of the present invention utilizes this significant difference between the temperature of the warm surface waters and the relatively cold water at ocean depths to generate electricity. In addition to tropical ocean waters, there are a number of large bodies of fresh water such as the Great Lakes, which exhibit substantial differences between the temperature of the surface waters and those at great depths in the lakes.

Returning to FIG. 1, warm sea water taken from near the surface or within the mixed zone above the thermocline of the ocean enters the system of the invention at inlet 14 and flows by gravity through the filter 16 which may include both coarse and fine filters in series for removing suspending particles larger than a desired size which might interfere with subsequent portions of the power generation cycle. The inlet water received through inlet 14 and filtered by the filter 16 is then subject to deaeration by the deaeration structure 18 which may include venting arrangements as indicated schematically by the arrow 20. If desired, the venting means may be associated with a vacuum pump to reduce the pressure in the upper portion of deaeration structure 18, and this may be accomplished by an additional connection to the vacuum pump 22 which appears to the right in FIG. 1. Incidentally, the water level 24 of the water which has entered through the inlet 16 is shown as somewhat lower than the surface 26 of the ocean 12. However, in the event of a significant reduction in pressure within structure 18 as a result of the vent 20, the level 24 might actually be slightly above the surface 26 of the ocean 12.

Leaving the deaerator 18, the warm water falls through the penstock 28 into the runner 29 of hydraulic turbine 30 which drives the electrical generator 32. The turbine and electrical generator 30 and 32 are conventional equipment. Electricity from generator 32 is employed to power the various pumps employed in the system, and of course its primary purpose is to supply substantial quantities of output electricity for other purposes.

Following the power extraction step, the warm water is now at an even lower pressure or head. Through the duct 34 the water passes into a second deaerator 36 for further removal of dissolved gases. As in the case of deaerator 18, the deaerator 36 may be provided with a vent 38 which may also be coupled to a vacuum pump.

Figure 3:
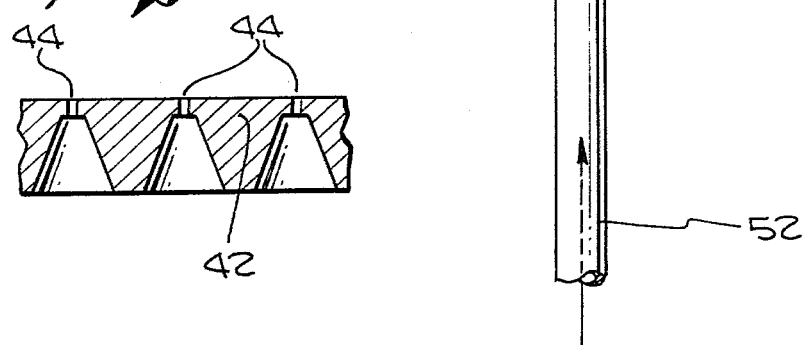
FIG. 3 is a partial cross-sectional view of a spray generation plate which may be employed in the system of FIGS. 1 and 2.

From the deaerator 36, the warm water enters the plenum 40 feeding the mist generator 42. The mist generator 42 is preferably in the form of an apertured plate 42 of the type shown in FIG. 3. More specifically, the small apertures 44 in the plate 42 of FIG. 3 are in the order of one-tenth of a millimeter in diameter. With this diameter hole, when water is sprayed up through the holes, the droplets which will be formed are in the order of 0.2 millimeters in diameter. Other spray generation arrangements may be provided in place of the apertured plate 42.

The chamber or duct 46 above the plate 42 is preferably evacuated by the vacuum pump 22 to a pressure in the order of 0.46 pounds per square inch pressure. This is to be compared with atmospheric pressure which is in the order of 14.7 pounds per square inch. With this relatively low pressure, water at 25° C. will boil, and the droplets of warm water immediately form large quantities of steam. The pressure decreases in the upward direction to a sufficient extent that the vapor is drawn rapidly upwards, carrying the suspended droplets of water with it. As the mixture moves upward into zones of lower and lower pressure, the vapor pressure of the warm droplets exceeds that of the surrounding vapor, and evaporation proceeds, increasing the amount of vapor and cooling the droplets. This spontaneous process continues until both the vapor and the droplets enter the condenser region 48, and encounter the direct contact sprays 50. The water supplying the cold water sprays 50 is drawn through duct 52 from the colder lower depths of the ocean by pump 54 and passes via conduit 56 and deaerator 58 to the duct 60 supplying the cold water sprays 50. Incidentally, the deaerator 58 may be provided with a vent 62 connected to the vacuum pump 22.

The mixed intermediate temperature water collected in the conduit 64 is returned to the ocean at an intermediate depth through outlet 66. A condenser 68 is provided to block the passage of water vapor to the evacuating pump 22.

Incidentally, the distance represented by the arrow 72 at the left-hand side of FIG. 1 could be in the order of about 50 meters.

It is also noted that, under the conditions described hereinabove, the approximate velocity for supersonic travel of the vapor and suspended droplets in the tube or duct 46 is in the order of 15 meters per second. Incidentally, the speed of sound in the mixture varies significantly with the liquid fraction, or the ratio of liquid to vapor in the duct, as well as with the pressure and temperature. Of course, the number of orifices per unit area will directly affect the initial ratio of liquid to vapor in the duct. In general, the velocity of the flow in the duct 46 will be a function of the pressure in the plenum 40, and the pressure which is present in the duct 46. By varying these factors, including the liquid-to-vapor ratio, and the pressures mentioned above, the mist flow may be managed and controlled as desired. Further, the upward velocity of flow can be made "critical" or equal to the velocity of sound, or above or below the "critical" velocity by varying the duct design and the other parameters. On a preliminary basis, in order to increase the volume of liquid which is pumped and to stabilize the flow, supersonic or "above-critical" velocities are preferred.

Figure 2:
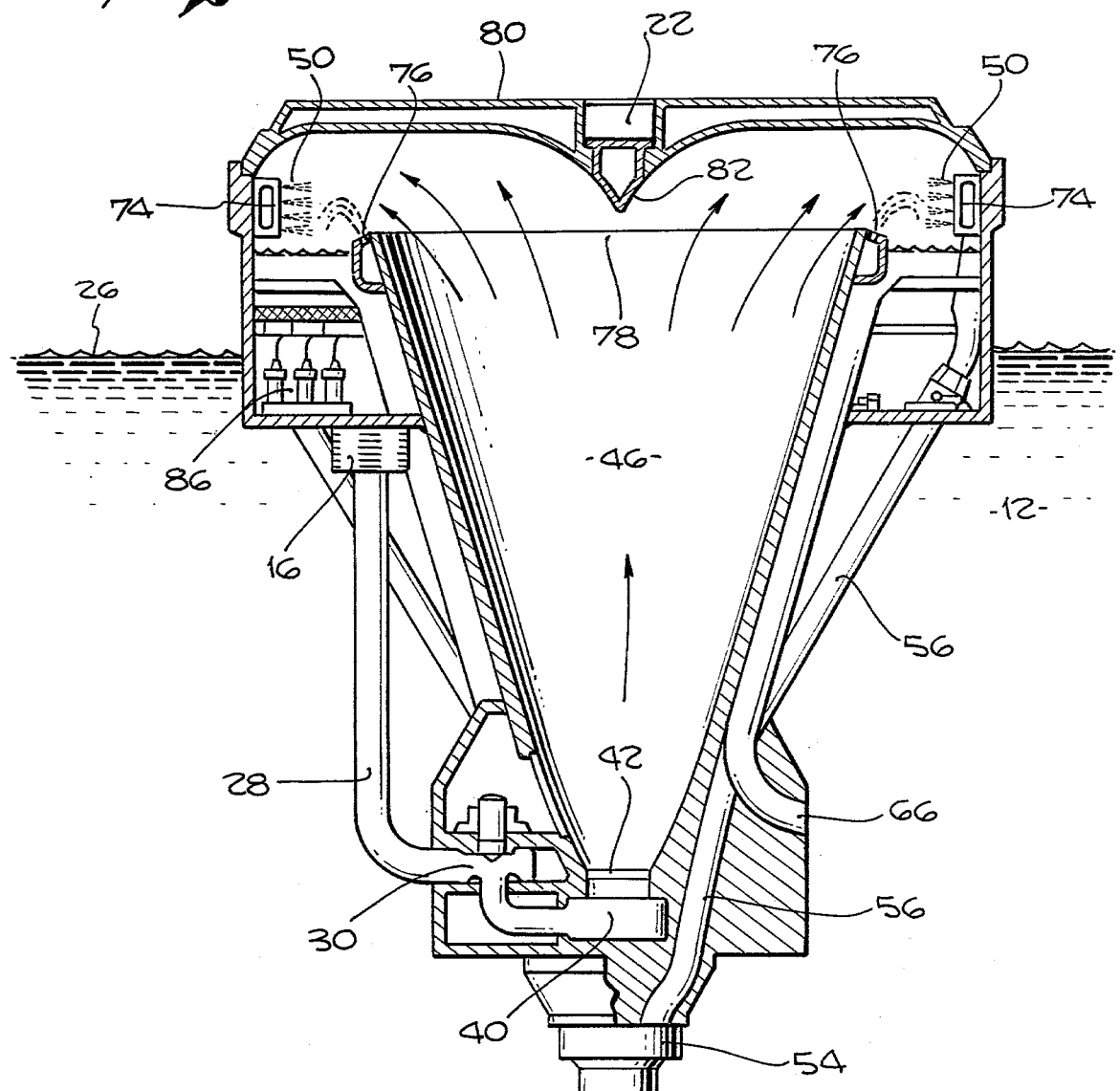
FIG. 2 is a showing of the presently preferred construction for implementing the system shown schematically in FIG. 1.

FIG. 2 shows the system of FIG. 1 embodied in an inverted conical or pyramidal structure which has a naturally stable floating hull shape. In FIG. 2 many of the system components as shown in FIG. 1 are identified by the corresponding numbers used in FIG. 1. The pyramidal overall configuration of the floating structure lends itself to the desired expanding or funnel shape for the central duct 46, and concentric sets of spray nozzles 74 and 76 to provide the condensing spray 70 around the exterior of the upper lip 78 of the duct 46.

The upper surface 80 of the floating structure may be provided with an inwardly extending central projection 82 in order to better direct the mist flow toward the condensing sprays 50 around the periphery. If desired, the pump 42 which reduces the pressure within the duct 46 and which is also coupled to the deaerators, may be located in the upper central portion of the base of the floating structure. Of course, the various vertically extending conduits and ducts shown "unfolded" in FIG. 1 are mechanically tied together in the showing of FIG. 2, and all ducts may be included in the hull structure, if desired. Suitable electrical equipment 86, including transformers, may be provided for handling the electrical power which is generated, preparatory to distribution.

In the description of the particular example set forth above, certain specific values and dimensions were mentioned. Thus, for example, it was noted that (1) the height from the water surface to the turbine could be about 50 meters, (2) that the pressure at the top of duct 46 could be about 0.248 pounds per square inch, (3) that the temperature of the inlet water could be about 25° C., and (4) that the temperature of the cold water brought in from the ocean depths is about 5° C. To arrive at the reduced pressure of 0.248 pounds per square inch, (absolute not gauge, pressure), it was assumed that equal amounts of warm water at 25° C. and cold water at 5° C. are combined, and that the resultant water temperature in the condenser is about 15° C. 0.248 pounds per square inch pressure is the vapor pressure of water at 15° C., or the pressure below which the condenser water would start to boil. Accordingly, this low pressure (less than 1/50 of an atmosphere) is below the saturation pressure of the warmer 25° C. water being sprayed through the plate 42, and this insures rapid creation of water vapor from the warm spray.

The following table indicates the amount of lift which can theoretically be derived from the energy supplied from the temperature drop from 25° C. to various lower temperatures.

| ISENTROPE OF SATURATED WATER FROM 25° C. TO 7° C. INITIAL STATE 100% LIQUID | | | | |
|---|---|---|---|---|
| Temperature °C. | Mass % Steam | Enthalpy Drop (j/g) | Specific Volume (cm³/gram) | Lift (m) |
| 25 | 0.0 | 0.0 | 1.0 | 0.0 |
| 24 | .17 | .007 | 79 | .7 |
| 23 | .34 | .028 | 166 | 2.9 |
| 22 | .51 | .063 | 263 | 6.4 |
| 21 | .68 | .1128 | 371 | 11.5 |
| 20 | .84 | .1765 | 492 | 18.0 |
| 19 | 1.01 | .2545 | 621 | 26.0 |
| 18 | 1.18 | .3468 | 767 | 35.4 |
| 17 | 1.34 | .4534 | 928 | 46.2 |
| 16 | 1.51 | .5745 | 1106 | 58.6 |
| 15 | 1.67 | .7101 | 1302 | 72.4 |
| 14 | 1.83 | .8602 | 1519 | 87.7 |
| 13 | 1.99 | 1.025 | 1758 | 104.6 |
| 12 | 2.15 | 1.204 | 2021 | 122.8 |
| 11 | 2.31 | 1.398 | 2312 | 142.6 |
| 10 | 2.47 | 1.607 | 2632 | 163.9 |
| 9 | 2.63 | 1.830 | 2984 | 186.7 |
| 8 | 2.79 | 2.069 | 3373 | 211.0 |
| 7 | 2.95 | 2.322 | 3801 | 236.8 |

As can be observed from the foregoing table, the drop in temperature from 25° C. to 15° C. is theoretically sufficient to raise the water by 72.4 meters. Accordingly, even with reasonably expected inefficiencies and peripheral equipment losses, a distance of 50 meters is practical.

Of course, if more cold water is drawn into the condenser than warm water, then the 15° C. temperature could be reduced, and more energy would be available. Also, if seasonal changes reduced the temperature of the surface water, this would be an adverse factor which might reduce the available temperature difference.

In summary, a stable seaworthy structure is provided which enjoys the important advantages of an open cycle system. In addition, the problems of windage and instability of systems such as that proposed by Mr. Beck are avoided; and the application of water to the hydraulic turbine before the lifting step avoids other problems including the separate handling of vapor and liquid, inherent in the Beck proposals.

In closing, it may be noted that the system as described hereinabove avoids many of the disadvantages of previously proposed arrangements and constitutes a durable and economical apparatus for extracting useful energy from the temperature gradient in the ocean or other large bodies of water. The detailed realization of the various components included in the system can vary in detail, appearance, material, and mode of operation as is apparent to those skilled in the art, and still perform the essential functions and realize the unique advantages of the present system and process. The present invention is therefore only to be limited by the appended claims.

What is claimed is:

1. An apparatus for recovering energy from warm and cold ocean waters comprising:
   a floating structure extending from above the surface of the ocean to a significant depth;
   intake and filtering means for receiving warm water from near the surface of the ocean;
   deaeration means for removing some of the gases from said intake water;
   downwardly extending penstock or water guiding means for said warm surface water;
   energy extraction or turbine means coupled to receive said warm water from said guiding means;
   further deaeration means for removing additional gases from the water after it exits the turbine;
   means for raising the warm water from said turbine to substantially its original level, including mist generation means located substantially at the level of said energy extraction turbine means for forming said water into a mist, means extending from said mist generation means toward the top of the structure for guiding said mist, and vaccum pumping means for reducing the atmospheric pressure in the mist guiding means;
   condensing means for returning said mist and vapor to the liquid form;
   cold water intake and pumping means for supplying cold water from a deeper level of the ocean to said condensing means; and
   means for discharging the resultant intermediate temperature liquid into the ocean.

2. An apparatus as defined in claim 1 wherein said apparatus is generally pyramidal or frustoconical in form, and is buoyant and floats stably with the reduced cross-section portion down.

3. An apparatus as defined in claim 2 wherein said duct is tapered with the wider end above the end of reduced cross-section.

4. An apparatus for generating electricity from a large body of water comprising:
   a structure extending from above the surface of the water to a substantial distance below the surface of the water;
   an hydraulic turbine supported by the structure and located well below the surface of the body of water; and
   thermal gradient means for operating said hydraulic turbine in accordance with utilization of temperature differences present at various depths in said body of water including conduit means for bringing warm water into said structure from near the surface of the body of water and directing it to drive said turbine, and means for raising the warm water from the turbine to the surface of the body of water.

5. An apparatus for generating electricity from the thermal gradient in a large body of water comprising:
   a structure extending from above the surface of the water to a substantial distance below the surface of the water;
   an hydraulic turbine supported by the structure and located well below the surface of the body of water;
   conduit means for bringing warm water into said structure from near the surface of the body of water and directing it to drive said turbine; and
   means for raising the warm water from the turbine to the surface of the body of water, including a duct extending from the vicinity of the output of said turbine to a point near the surface of said water, means for at least partially evacuating said duct, means for spraying very fine droplets of warm water from said turbine into the lower end of said duct, whereby the generated vapor will carry the droplets up through the duct, and means for utilizing cold water drawn from deep in said body of water to condense the mist rising through said duct.

6. An apparatus as defined in claim 5 wherein said apparatus is generally pyramidal or frustoconical in form, and is buoyant and floats stably with the reduced cross-section portion down.

7. An apparatus as defined in claim 5 wherein said duct is tapered with the wider end above the end of reduced cross-section.

8. An apparatus for generating electricity from the thermal gradient in a large body of water comprising:
   a structure extending from above the surface of the water to a substantial distance below the surface of the water;
   an hydraulic turbine supported by the structure and located well below the surface of the body of water;
   conduit means for bringing warm water into said structure from near the surface of the body of water and directing it to drive said turbine;
   means for raising the warm water from the turbine to the surface of the body of water; and
   deaeration means for removing at least some of the gases from said water before it is raised to the surface of the body of water.

9. A method for generating electricity from a thermal gradient in a large body of water comprising the steps of:
   drawing input warm water from the surface of the body of water;

generating electricity by conducting said warm water to an hydraulic turbine located below the point where said water is drawn in;

producing a dispersion of water droplets in evaporated water vapor, with the water vapor being the continuous phase;

evacuating the space where said mixture is formed o cause the mixture to flow upward;

guiding and containing the mixture; and condensing said mixture to the liquid state.

10. A method as defined in claim 9 further comprising the steps of:

filtering and deaerating the input warm water; and drawing cold water from the depths of said body of water to utilize in said condenser.

11. A method as defined in claim 9 wherein said flow is substantially at the critical velocity of sound in said dispersion.

12. A method as defined in claim 9 wherein said flow is substantially above the critical velocity of sound in said dispersion.

13. A method as defined in claim 9 wherein said flow is substantially below the critical velocity of sound in said dispersion.

14. An apparatus for producing energy comprising:

a structure extending downwardly from a warm water zone in a body of water to a significant depth within said body of water where the water is significantly colder;

means for supporting said structure within said body of water;

intake means for receiving relatively warm water from said warm water zone;

downwardly extending penstock means for guiding said warm water;

energy extraction or turbine means coupled to receive said warm water from said penstock means;

means for raising the relatively warm water from said turbine to substantially its original level, including mist generation means located substantially at the level of said energy extraction or turbine means for forming said water into a mist, and means extending from said mist generation means toward the top of the structure for guiding said mist;

condensing means for returning said mist and vapor to the liquid form; and means for discharging the resultant liquid into the body of water.

15. A method for generating power from thermal differences comprising:

drawing relatively warm or hot water from an available source;

injecting the warm water into the lower portion of a chamber having a substantial vertical extent, and forming a mist of droplets surrounded by a continuous phase of vapor formed by partial evaporation of the droplets;

evacuating said chamber;

causing the mixture of droplets and vapor to flow upwards in the chamber by connecting the upper portion of said chamber with a condenser, said condenser being maintained at a substantially lower temperature than said source of water;

guiding and containing the upward flow of said mixture;

collecting the liquid droplets from the mist at the upper level of the chamber;

generating power by harnessing the difference in head produced by lifting the mist.

16. A method as defined in claim 15 including the steps of initially directing the warm water to a lower level and applying it to a turbine, and subsequently forming said mist.

17. An apparatus for generating power from thermal differences comprising:

intake means for receiving water from a warm source of water;

dispersion means for producing a mist of warm water or brine droplets dispersed in vapor formed by partial evaporation of the droplets, with vapor being the continuous phase;

guiding and containing means of substantial vertical extent for receiving the mist from the dispersing means and conducting it in an upward direction under the influence of a difference in vapor pressure between the upper and lower ends of said guiding and containing means;

condensing means connected to said guiding and containing means at its upper end, said condensing means including means for maintaining a substantially lower temperature than said source of warm water;

collecting means for receiving the droplets of water at the higher elevation;

evacuation means for removing noncondensible gases from the containing means; and power generating means for harnessing the difference of head produced by raising the water in said guiding and containing means.

18. An apparatus as defined in claim 17 including means for initially directing water from said warm source of water downward to said power generation means.

* * * * *